(12) United States Patent
Fujihira et al.

(10) Patent No.: US 6,745,739 B2
(45) Date of Patent: Jun. 8, 2004

(54) INTAKE SYSTEM OF AN ENGINE

(75) Inventors: Shinji Fujihira, Fuchu-cho (JP); Masanao Yamada, Fuchu-cho (JP); Takeshi Yokoo, Fuchu-cho (JP); Shunki Okazaki, Fuchu-cho (JP); Hiroshi Kinoshita, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/271,437

(22) Filed: Oct. 16, 2002

(65) Prior Publication Data
US 2003/0070646 A1 Apr. 17, 2003

(30) Foreign Application Priority Data

Oct. 17, 2001 (JP) ........................................ 2001-319807
Sep. 10, 2002 (JP) ........................................ 2002-264013

(51) Int. Cl.$^7$ ............................................. F02M 35/10
(52) U.S. Cl. .................................................. 123/184.21
(58) Field of Search ....................... 123/184.21, 184.61, 123/184.38, 184.28, 184.42, 193.5, 196 AB, 196 S

(56) References Cited

U.S. PATENT DOCUMENTS

| 4,237,848 A | * | 12/1980 | Korzhov et al. ............ 123/242 |
| 5,341,773 A | * | 8/1994 | Schulte et al. ......... 123/184.61 |
| 5,690,068 A | * | 11/1997 | Astner et al. .......... 123/184.21 |
| 5,988,131 A | * | 11/1999 | Hernandez et al. ..... 123/184.21 |
| 6,263,850 B1 | * | 7/2001 | Winmill et al. ........ 123/184.21 |

FOREIGN PATENT DOCUMENTS

| JP | 6212934 | 8/1994 |
| JP | 9189272 | 7/1997 |

* cited by examiner

Primary Examiner—Tony M. Argenbright
Assistant Examiner—Hyder Ali
(74) Attorney, Agent, or Firm—Brooks Kushman P.C.

(57) ABSTRACT

An intake system of an engine comprises an intake module, in which a throttle body joint portion and an upstream portion of an intake manifold are formed in a single structure, and a downstream portion of the intake manifold extending from an engine body. A downstream end of the intake module is joined to the downstream portion of the intake manifold and an end portion of the intake module opposite to its portion joined to the downstream portion of the intake manifold is connected to an uppermost part of an oil filler pipe which is connected to the engine body. In this construction, the intake module is supported by the engine body via the oil filler pipe.

24 Claims, 15 Drawing Sheets

INTAKE SYSTEM OF AN ENGINE

BACKGROUND OF THE INVENTION AND RELATED ART STATEMENT

1. Field of the Invention

The present invention relates to an intake system of an engine. More particularly, the invention pertains to a structure including an intake module in which a throttle body joint portion and an upstream portion of an intake manifold are formed in a single structure and a downstream portion of the intake manifold that is connected to the intake module.

2. Description of the Related Art

Various intake system designs for an engine have been proposed in recent years, in which an intake system including an intake manifold or part of an intake manifold is formed of synthetic resin material. When using the synthetic resin material in the intake system, it is essential to design the system in such a way that it has adequate stiffness for supporting the intake manifold and its associated parts.

An example of a conventional support mechanism for an intake system is proposed in Japanese Unexamined Patent Publication No. 09-189272. According to the Publication, an upper manifold made of synthetic resin is located above one bank of a V-type engine with a branch portion of the upper manifold at its one end connected to a lower manifold so that the branch portion at one end of the upper manifold is supported by an engine body in a manner that the branch portion of the upper manifold can freely move vertically, while the other end of the upper manifold is rigidly joined to the engine body via a support rod, for example.

In the conventional support mechanism of this kind, it is necessary to provide dedicated members for ensuring supporting stiffness like the support rod mentioned above in addition to members constituting the intake system. Thus, the conventional support mechanism for the intake system is associated with a problem that the support mechanism has an intricate construction which could result in an increase in manufacturing cost.

SUMMARY OF THE INVENTION

In light of the foregoing, it is an object of the invention to provide an intake system of an engine, wherein a throttle body joint portion and an upstream portion of an intake manifold are combined to form a one-piece intake module which is connected to a downstream portion of the intake manifold, the intake module being constructed such that it can be formed of synthetic resin material or the like, and wherein the intake system has increased mechanical stiffness to support the intake module while employing a simplified support mechanism.

According to the invention, an intake system of an engine comprises an intake module in which a throttle body joint portion and an upstream portion of an intake manifold are formed in a single structure and a downstream portion of the intake manifold, the downstream portion extending from an engine body and being connected to a downstream end of the intake module, the engine including an oil filler pipe of which lower end is connected to the engine body and upper end is connected to the intake module such that the intake module is supported by the engine body via the oil filler pipe.

In this construction, the intake module is connected to the intake manifold and is supported by the engine body via the oil filler pipe, so that sufficient mechanical stiffness for supporting the intake module is obtained. In particular, because the intake module is supported by using the oil filler pipe, mechanism for supporting the intake module is simplified.

In the intake system thus constructed, it is preferable that the lower end of the oil filler pipe be connected to an oil pan provided in the engine body and an oil catch chamber connected to the upper end of the oil filler pipe be integrally formed in the intake module.

This construction is advantageous in that the number of components is reduced resulting in a cost reduction compared to conventional structures in which an oil catch chamber is formed separately from an intake module.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

A first embodiment of the invention is described referring to FIGS. 1 to 6.

Figure 1:
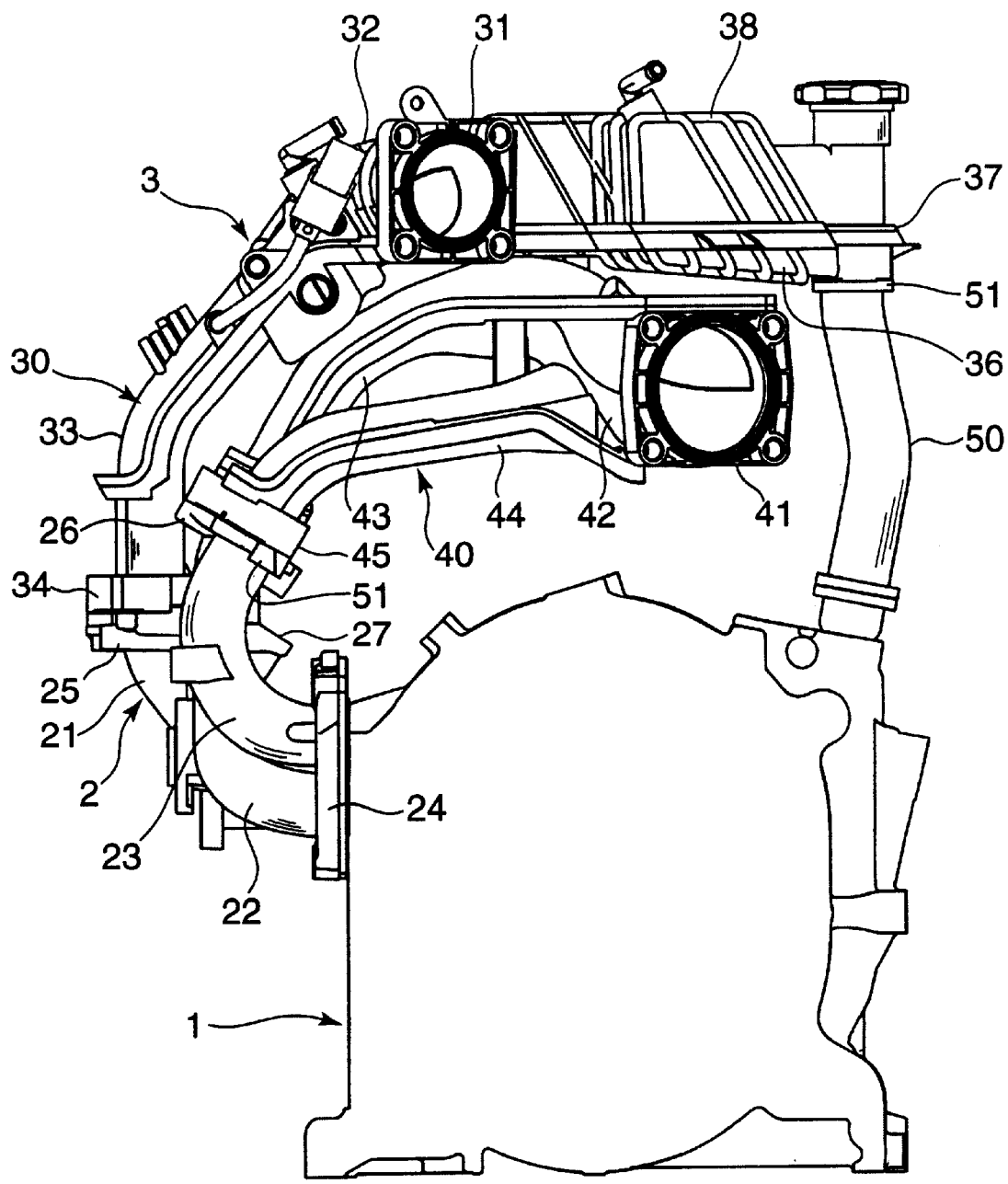
FIG. 1 is a front view of a two-cylinder rotary engine incorporating an intake system according to a first embodiment of the invention.
Figure 2:
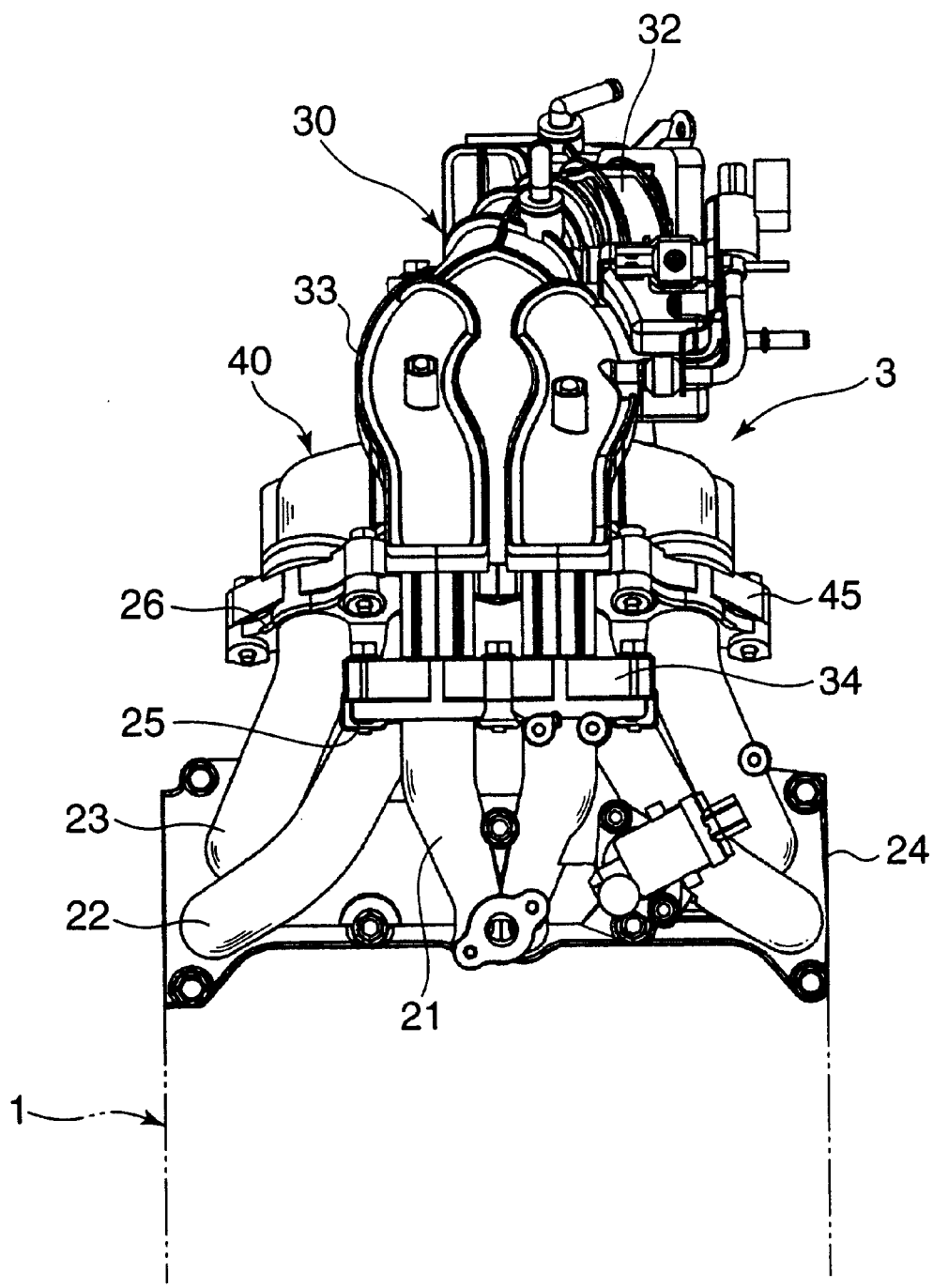
FIG. 2 is a left side view of the intake system of FIG. 1.
Figure 3:
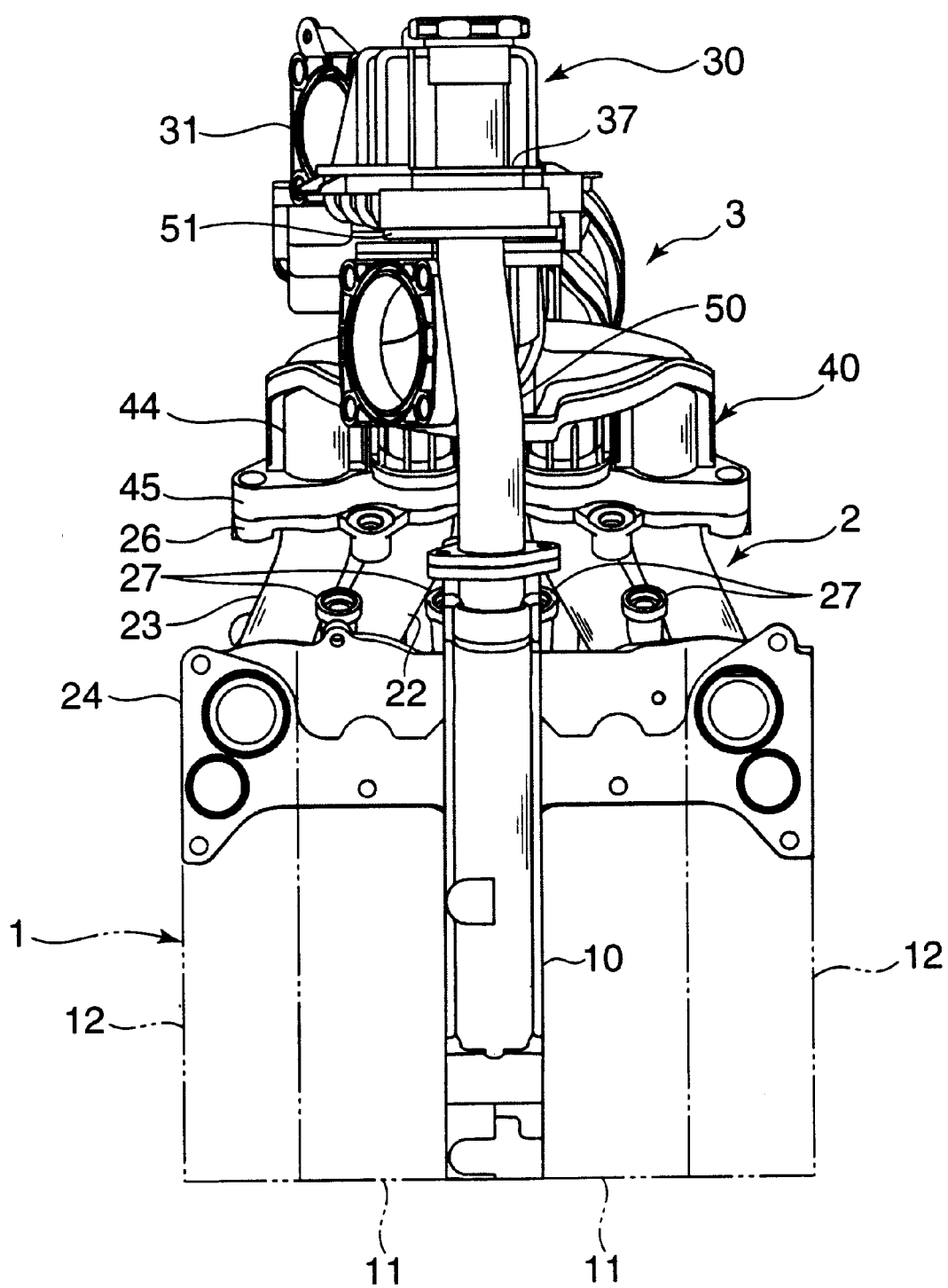
FIG. 3 is a right side view of the intake system of FIG. 1.

FIGS. 1 to 3 are diagrams showing the overall construction of an intake system according to the first embodiment of the invention as it is applied to a two-cylinder rotary engine of a motor vehicle. In these Figures, designated by the numeral 1 is an engine body of the rotary engine, designated by the numeral 2 is a downstream portion of an intake manifold extending from the engine body 1, and designated by the numeral 3 is an intake module in which a throttle body joint portion and an upstream portion of the intake manifold are formed in a single structure.

Figure 4:
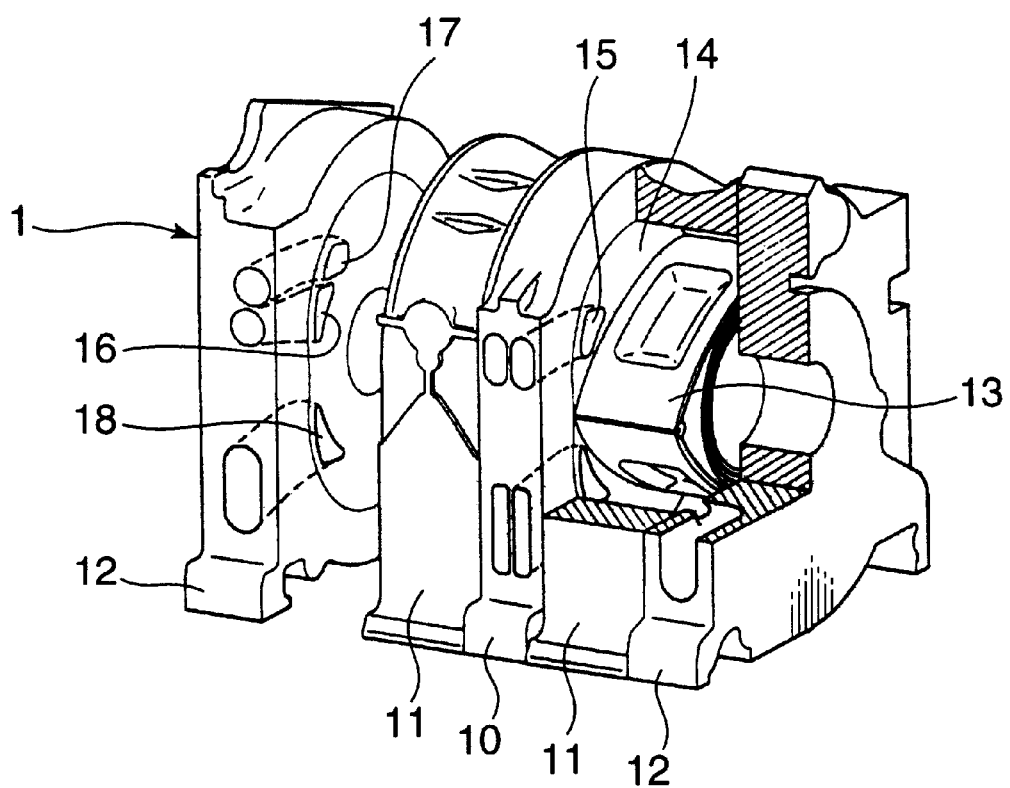
FIG. 4 is a perspective view of an engine body.
Figure 5:
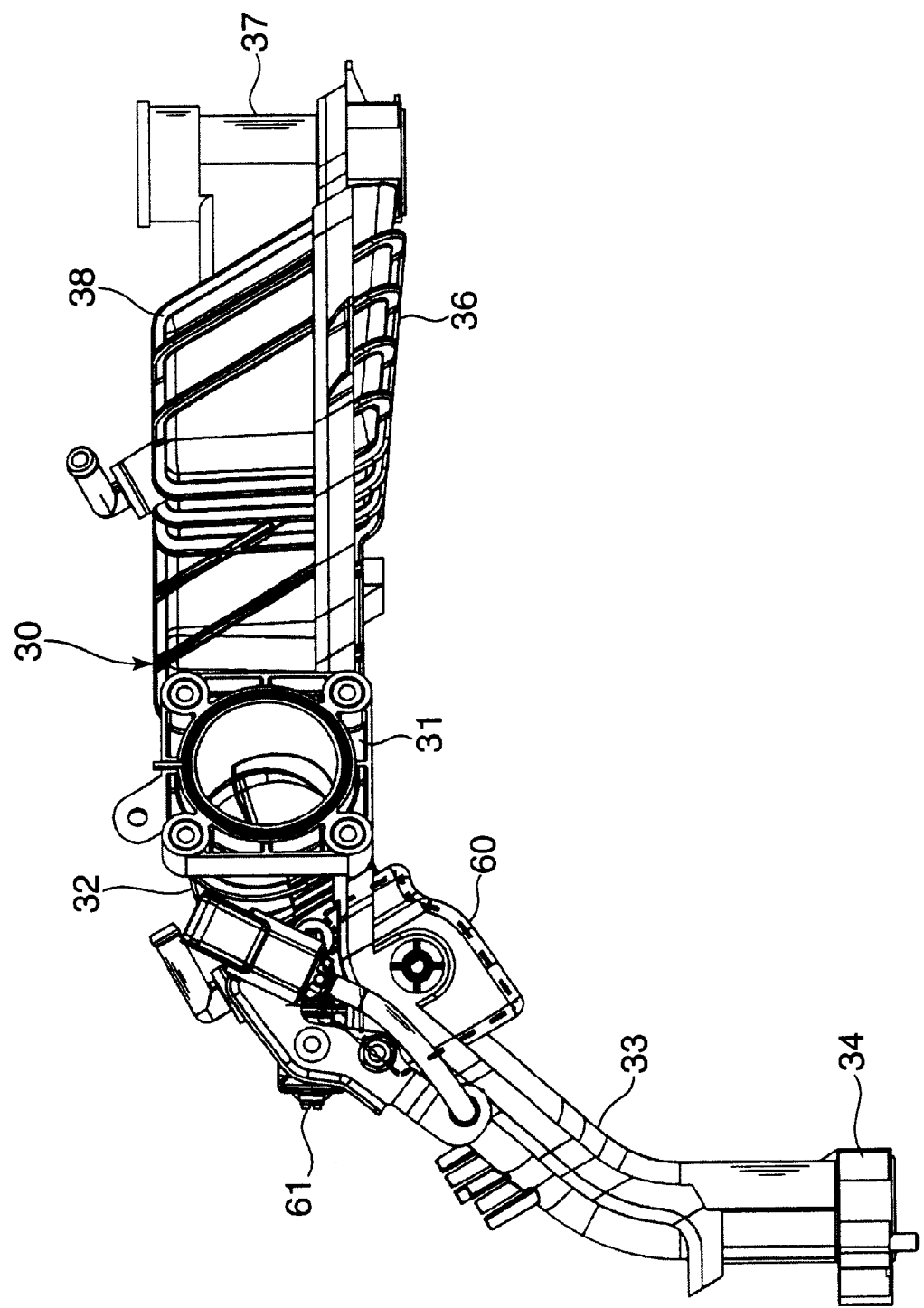
FIG. 5 is a front view of a first constituent section of an intake module.
Figure 6:
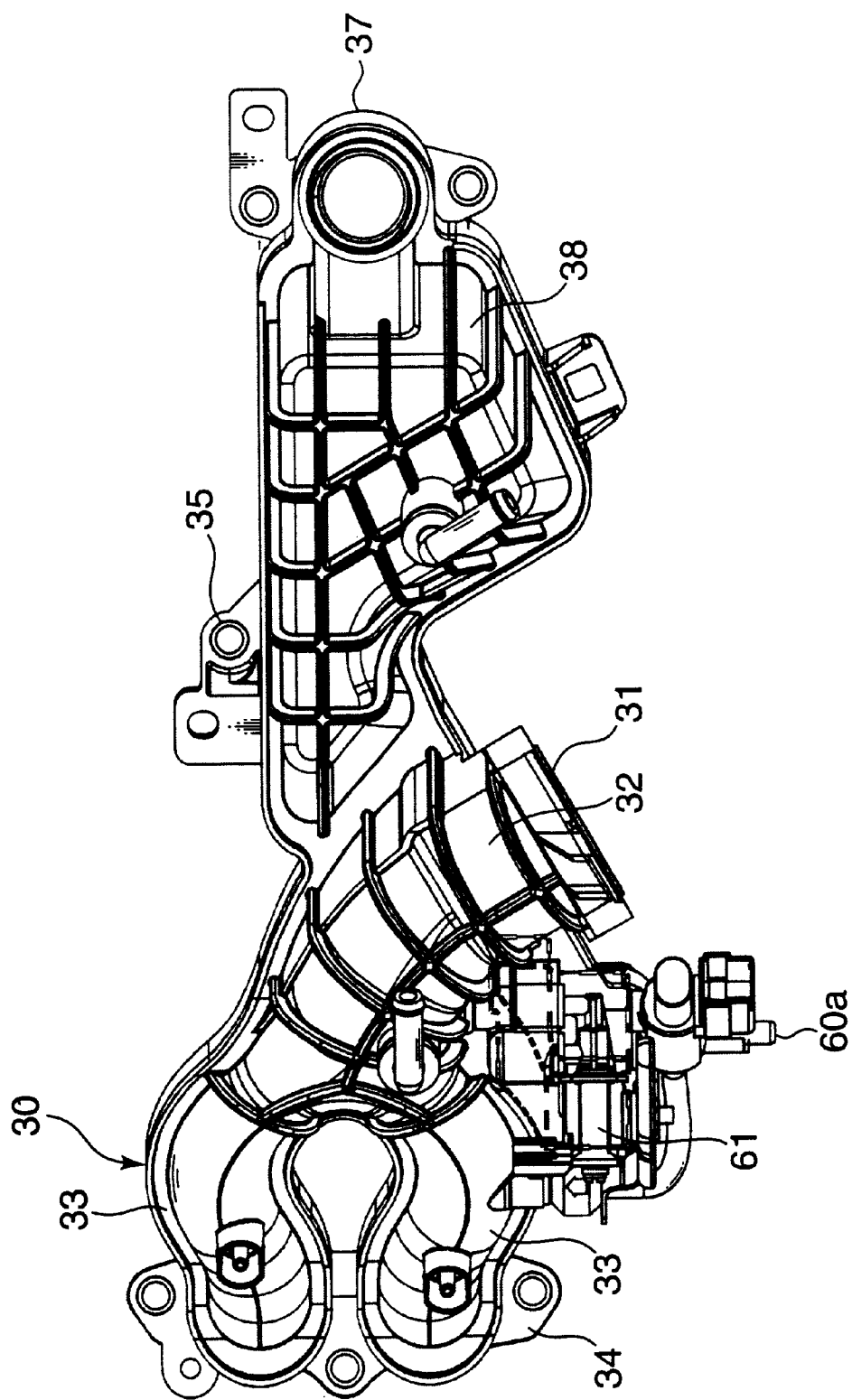
FIG. 6 is a plan view of the first constituent section of the intake module.

As shown in FIG. 4, the engine body 1 has a housing for two cylinders including an intermediate housing block 10, a pair of hollow rotor housing blocks 11 provided on both sides (left and right as illustrated in FIGS. 2, 3) and a pair of side housing blocks 12 located on the front and rear sides of the respective rotor housing blocks 11. An inner surface of each rotor housing block 11 is shaped into trochoidal form and a generally triangular-shaped rotor 13 is provided in each rotor housing block 11. Supported on an eccentric shaft (not shown), each rotor 13 makes an epicyclic rotary motion, forming three working chambers 14 between the rotor 13 and the inner surface of the rotor housing block 11.

Three intake ports 15, 16, 17 and an exhaust port 18 are formed in the intermediate housing block 10 and the side housing block 12, opening into an internal space (rotor chamber) of each rotor housing block 11. As the rotor 13 rotates, these intake ports 15, 16, 17 and the exhaust port 18 open and close with specific timing in the individual working chambers 14. In this embodiment, the intake ports 15, 16 and 17 provided in each rotor chamber are a primary intake port, a secondary intake port and an auxiliary secondary intake port, respectively. The primary intake port 15 is formed in the intermediate housing block 10 while the secondary intake port 16 and the auxiliary secondary intake port 17 are formed in each side housing block 12. Although not illustrated, a spark plug is provided at a specific location in each rotor housing block 11.

Made of cast aluminum, the downstream portion 2 of the intake manifold incorporates in a single structure two downstream side primary intake passages 21 connecting to the individual primary intake ports 15, two downstream side secondary intake passages 22 connecting to the individual secondary intake ports 16 and two downstream side auxiliary secondary intake passages 23 connecting to the individual auxiliary secondary intake ports 17. At an extreme downstream end of the downstream portion 2 of the intake manifold, there is formed a flange 24 for joining the downstream portion 2 of the intake manifold to the engine body 1. This flange 24 is bolted to an outer side surface of the engine body 1.

Upper parts of the downstream portion 2 of the intake manifold curve obliquely upward from the outside of the engine body 1 with first and second flanges 25, 26 formed at extreme upstream ends of the upper parts of the downstream portion 2 of the intake manifold for connecting them to the intake module 3. More specifically, the individual downstream side primary intake passages 21 curve relatively gently, and the first flanges 25 are integrally formed at extreme upstream ends of the downstream side primary intake passages 21 for joining them to a later-described first constituent section 30 of the intake module 3. On the other hand, upper parts of the downstream side secondary intake passages 22 and the downstream side auxiliary secondary intake passages 23 curve such that they are located inside (closer to the engine body 1 than) the downstream side primary intake passages 21, and the second flanges 26 are integrally formed at extreme upstream ends of the downstream side secondary intake passages 22 and the downstream side auxiliary secondary intake passages 23 for joining them to a later-described second constituent section 40 of the intake module 3. The first flanges 25 are so positioned that their upper joint surfaces lie generally in a horizontal plane whereas the second flanges 26 are so positioned that their upper joint surfaces slope down inward toward the engine body 1. With this arrangement, outside edges of the second flanges 26 are situated higher than inside edges of the first flanges 25, ensuring that the first flanges 25 do not interfere with the second flanges 26.

Fuel injector sockets 27 are individually formed in the downstream side primary intake passages 21 and the downstream side secondary intake passages 22 as their integral parts. Fuel is injected into the downstream side intake passages 21 and 22 from individual fuel injectors (not shown) fitted in the fuel injector sockets 27. Rotary valves (not shown) driven by respective actuators, such as motors, to open and close the auxiliary secondary intake ports 17 are provided in the respective downstream side auxiliary secondary intake passages 23. In this embodiment, the auxiliary secondary intake ports 17 are opened under high load conditions only.

The intake module 3 includes the aforementioned first constituent section 30 for supplying intake air to the primary intake ports 15 of the individual cylinders through the downstream side primary intake passages 21 and the aforementioned second constituent section 40 for supplying intake air to the secondary intake ports 16 and the auxiliary secondary intake ports 17 of the individual cylinders through the downstream side secondary intake passages 22 and the downstream side auxiliary secondary intake passages 23. The first constituent section 30 and the second constituent section 40 of the intake module 3 are separately formed of synthetic resin material.

The first constituent section 30 of the intake module 3 includes in a single structure a primary side collecting passage portion 32 having as its integral part a primary side throttle body joint portion 31 formed at an extreme upstream end of the primary side collecting passage portion 32 and two primary side intake air passages 33 connecting to the primary side collecting passage portion 32. Flanges 34 provided at downstream ends of the primary intake air passages 33 are bolted to the first flanges 25 at the upstream ends of the downstream portion 2 of the intake manifold, whereby the first constituent section 30 is joined to the downstream portion 2 of the intake manifold in such a manner that the primary intake air passages 33 are connected to the respective downstream side primary intake passages 21. A primary side throttle body (not shown) incorporating a primary side throttle valve is connected to the aforementioned primary side throttle body joint portion 31 by bolt joint.

On the other hand, the second constituent section 40 includes in a single structure a secondary side collecting passage portion 42 having as its integral part a secondary side throttle body joint portion 41 formed at an extreme upstream end of the secondary side collecting passage portion 42 and two each secondary side intake air passages 43 and auxiliary secondary intake passages 44 connecting to the secondary side collecting passage portion 42. Flanges 45 provided at downstream ends of these passages 43, 44 are bolted to the second flanges 26 at the upstream ends of the downstream portion 2 of the intake manifold, whereby the second constituent section 40 is joined to the downstream portion 2 of the intake manifold in such a manner that the secondary intake air passages 43 are connected to the respective downstream side secondary intake passages 22 and the auxiliary secondary intake passages 44 are connected to the respective downstream side auxiliary secondary intake passages 23. A secondary side throttle body (not shown) incorporating a secondary side throttle valve is connected to the aforementioned secondary side throttle body joint portion 41 by bolt joint.

The first and second constituent sections 30, 40 of the intake module 3 are constructed such that their intake air passages 33, 43, 44 bend or curve and their respective upstream portions located above the engine body 1 and connected to the downstream portion 2 of the intake manifold extend generally horizontally with the upstream portion of the first constituent section 30 located above the upstream portion of the second constituent section 40. A specific point of the upstream portion of the second constituent section 40 is bolted to a joint tab 35 (shown in FIG. 6) provided on the first constituent section 30.

The first constituent section 30 of the intake module 3 is supported by its end portion opposite to the portion joined to the downstream portion 2 of the intake manifold with an oil filler pipe 50 connected between the first constituent section 30 and the engine body 1. Further details of this structure are as follows. The first constituent section 30 is provided as its integral part with an extended portion 36 which extends sideways generally in a horizontal direction from a lower part of an outer wall of the primary side collecting passage portion 32. This extended portion 36 extends in a direction generally opposite to the primary intake air passages 33 in plan view (FIG. 6) and has a pipe sleeve 37 formed at a far end of the extended portion 36. An uppermost part of the oil filler pipe 50 is fitted in the pipe sleeve 37. Also made in the extended portion 36 is an oil catch chamber 38 formed of a bottom and an outer wall surrounding an upper space of the bottom, creating a hollow internal space (not shown) having a relatively large capacity.

The aforementioned oil filler pipe 50 is a metallic pipe for supplying engine oil. The oil filler pipe 50 is fixed to the engine body 1 with its lower end connected to an oil pan (not shown) provided in the engine body 1 and the uppermost part fitted in the pipe sleeve 37. The aforementioned end portion of the first constituent section 30 of the intake module 3 is supported by a flangelike supporting part 51 provided close to the uppermost part of the oil filler pipe 50. There are formed connecting holes (not shown) in a surrounding wall of the pipe sleeve 37 and the oil filler pipe 50 at their corresponding points. After the oil filler pipe 50 has been fitted in the pipe sleeve 37, the oil filler pipe 50 is joined to the oil catch chamber 38 using the connecting holes.

The first constituent section 30 of the intake module 3 is further provided as its integral part with an evaporated fuel reservoir 60 formed in the outer wall of the primary side collecting passage portion 32 and a purge valve 61 fitted to the evaporated fuel reservoir 60. The evaporated fuel reservoir 60 and the primary side collecting passage portion 32 are connected to each other by an evaporated fuel conducting passage (not shown) which is opened and closed by the purge valve 61 situated in the evaporated fuel inlet passage. An evaporated fuel supply passage for introducing evaporated fuel fed from an unillustrated fuel tank through a canister is connected to an evaporated fuel inlet 60a of the evaporated fuel reservoir 60.

According to the above-described intake system of the first embodiment, the intake module 3 is formed of synthetic resin material to achieve a reduction in manufacturing cost, and because one end portion of the intake module 3 is joined to the downstream portion 2 of the intake manifold while the other end portion of the intake module 3 is supported by the engine body 1 via the metallic oil filler pipe 50, sufficient mechanical stiffness for supporting the intake module 3 is obtained. In particular, it is possible to ensure sufficient stiffness to support the intake module 3 with a simplified support mechanism, because the oil filler pipe 50 connected to the engine body 1 for feeding fuel works also as a structural member for supporting the intake module 3.

Furthermore, because the oil catch chamber 38 connected to the oil filler pipe 50 is provided in the intake module 3,
it is possible to prevent oil leakage to the exterior due to overflow of oil into the oil catch chamber 38 which occurs when oil flows over the upper end of the oil filler pipe 50 as a result of a rise in oil level in the oil filler pipe 50 during a turn of the vehicle. In addition, as the oil catch chamber 38 is formed as an integral part of the intake module 3, the number of components is reduced compared to conventional structures in which an oil catch chamber is formed separately from an intake module.

In the above-described engine structure, the engine body 1 has two cylinders, each provided with the three intake ports 15, 16, 17, and the intake module 3 is divided into the first constituent section 30 having two primary intake air passages 33 for supplying intake air to the primary intake ports 15 of the individual cylinders and the second constituent section 40 having four intake air passages (two each secondary intake air passages 43 and auxiliary secondary intake passages 44) for supplying intake air to the secondary intake ports 16 and the auxiliary secondary intake ports 17 of the individual cylinders, the first constituent section 30 being arranged on top of the second constituent section 40. This structure makes it possible to make the intake module 3 compact and increase its stability since the second constituent section 40 having a larger number of intake air passages is situated on the bottom side.

Moreover, because the flanges 25, 34 connecting the first constituent section 30 to the downstream portion 2 of the intake manifold are so positioned that their upper joint surfaces lie generally in a horizontal plane whereas the flanges 26, 45 for connecting the second constituent section 40 to the downstream portion 2 of the intake manifold are so positioned that their upper joint surfaces are located closer to the engine body 1 and their upper joint surfaces slope down inward toward the engine body 1, it is possible to prevent interference between the upper joint surfaces of the flanges 25, 34 and those of the flanges 26, 45 and increase flexibility in layout of the intake module 3 and the downstream portion 2 of the intake manifold.

A second embodiment of the invention is now described referring to FIGS. 7 to 14, in which elements identical to those depicted in FIGS. 1 to 6 are designated by the same reference numerals.

Figure 7:
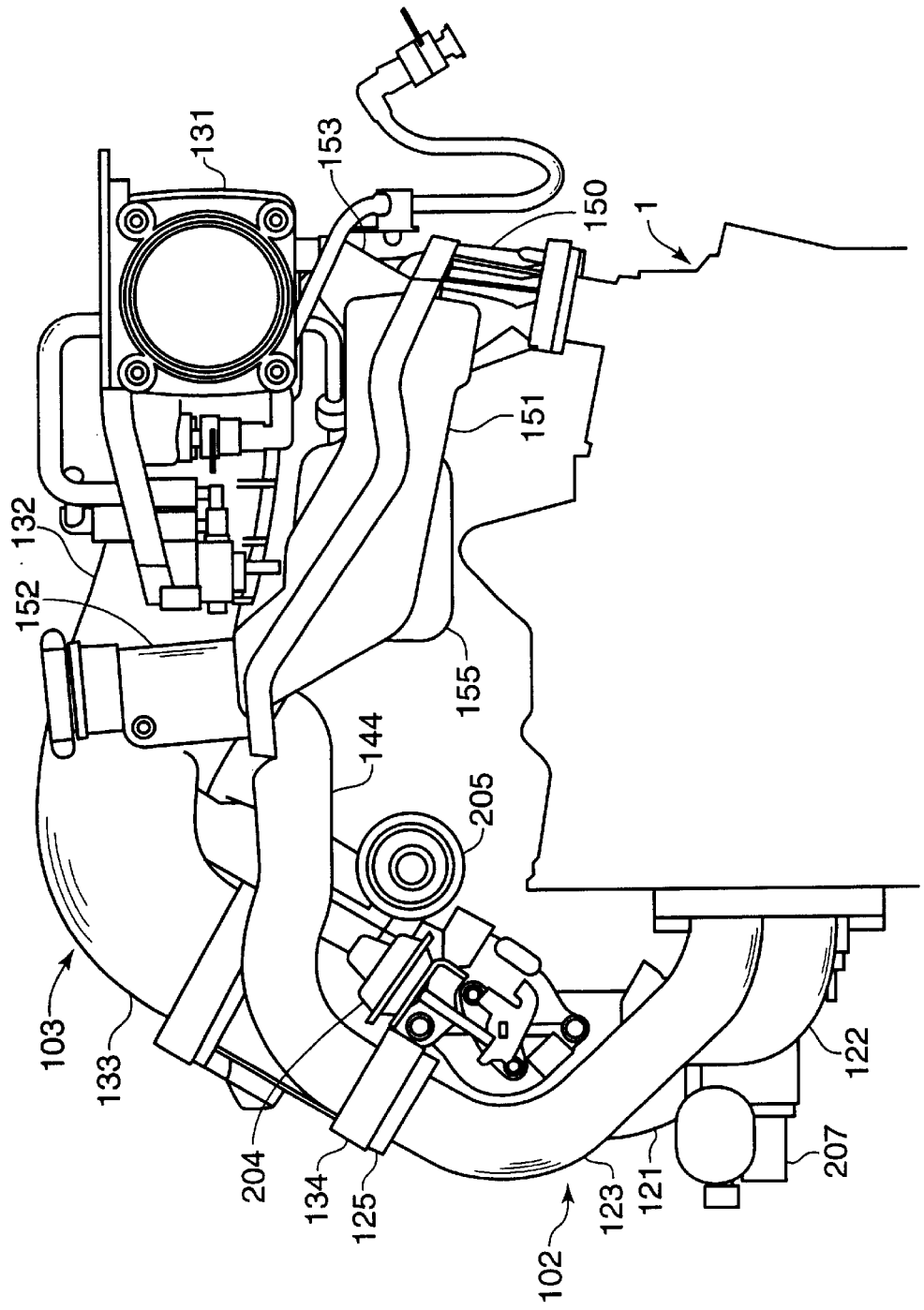
FIG. 7 is a front view of a two-cylinder rotary engine incorporating an intake system according to a second embodiment of the invention.
Figure 8:
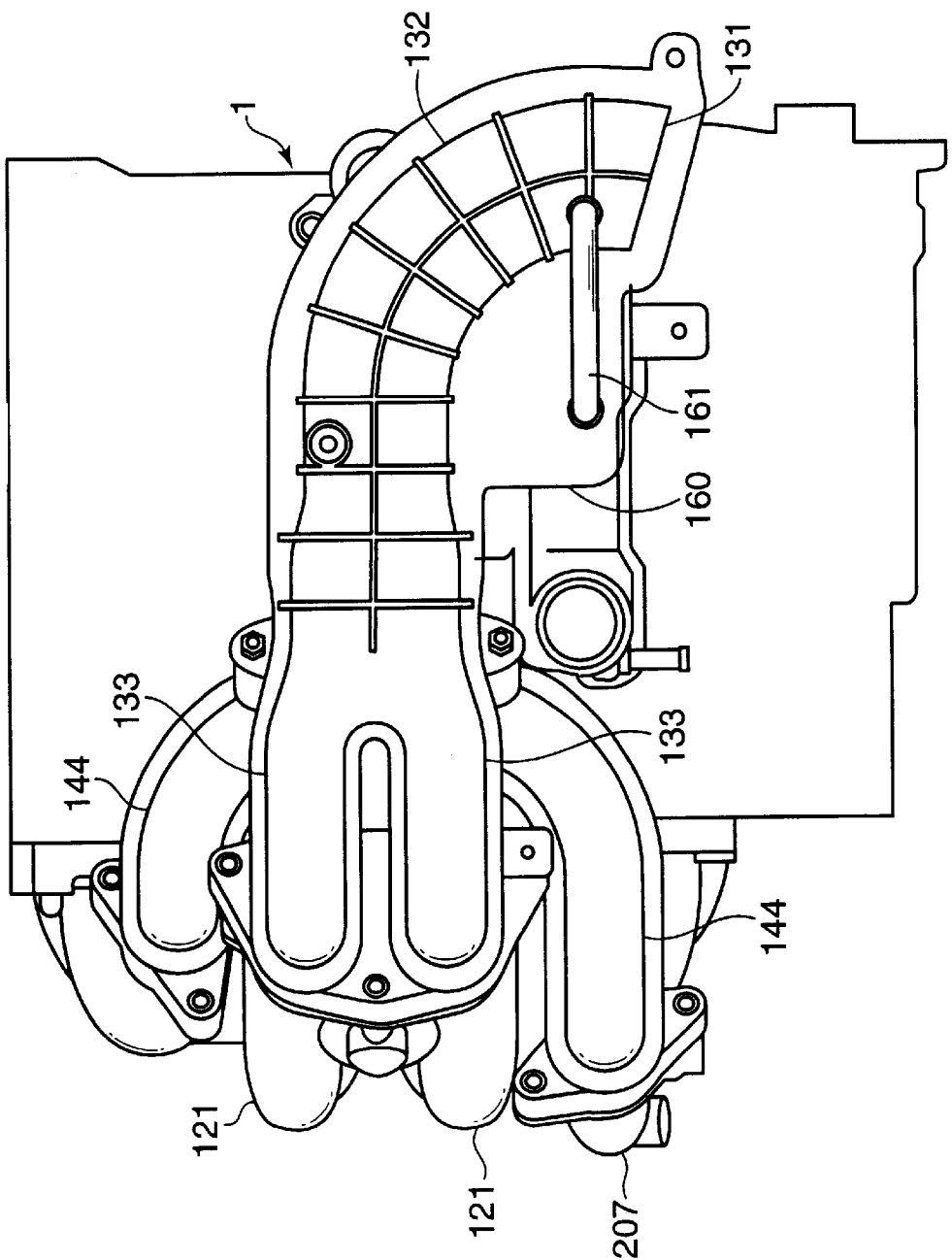
FIG. 8 is a plan view of the intake system of FIG. 7.

The second embodiment is also applied to a two-cylinder rotary engine of a motor vehicle of which engine body 1 has a structure similar to that of the first embodiment. FIGS. 7 and 8 are diagrams showing the overall construction of an intake system according to the second embodiment of the invention. The intake system of this embodiment comprises an intake module 103 made of synthetic resin material and a downstream portion 102 of an intake manifold formed of cast aluminum. The intake module 103 includes a pair of intake air passages 133 instead of each combination of the primary intake air passage 33 and the secondary intake air passage 43 of the first embodiment, in which parts constituting a throttle body joint portion and an upstream portion of the intake manifold excluding auxiliary secondary intake passages 144 are combined into a single structure. The downstream portion 102 of the intake manifold includes a pair of downstream side secondary intake passages 122 connected to corresponding downstream side primary intake passages 121 and an interconnect passage 202 (FIG. 9) interconnecting the two downstream side primary intake passages 121. These passages 121, 122 and downstream side auxiliary secondary intake passages 123 are formed in a single structure. Further, various valves and actuators are assembled in the downstream portion 102 of the intake manifold.

Figure 9:
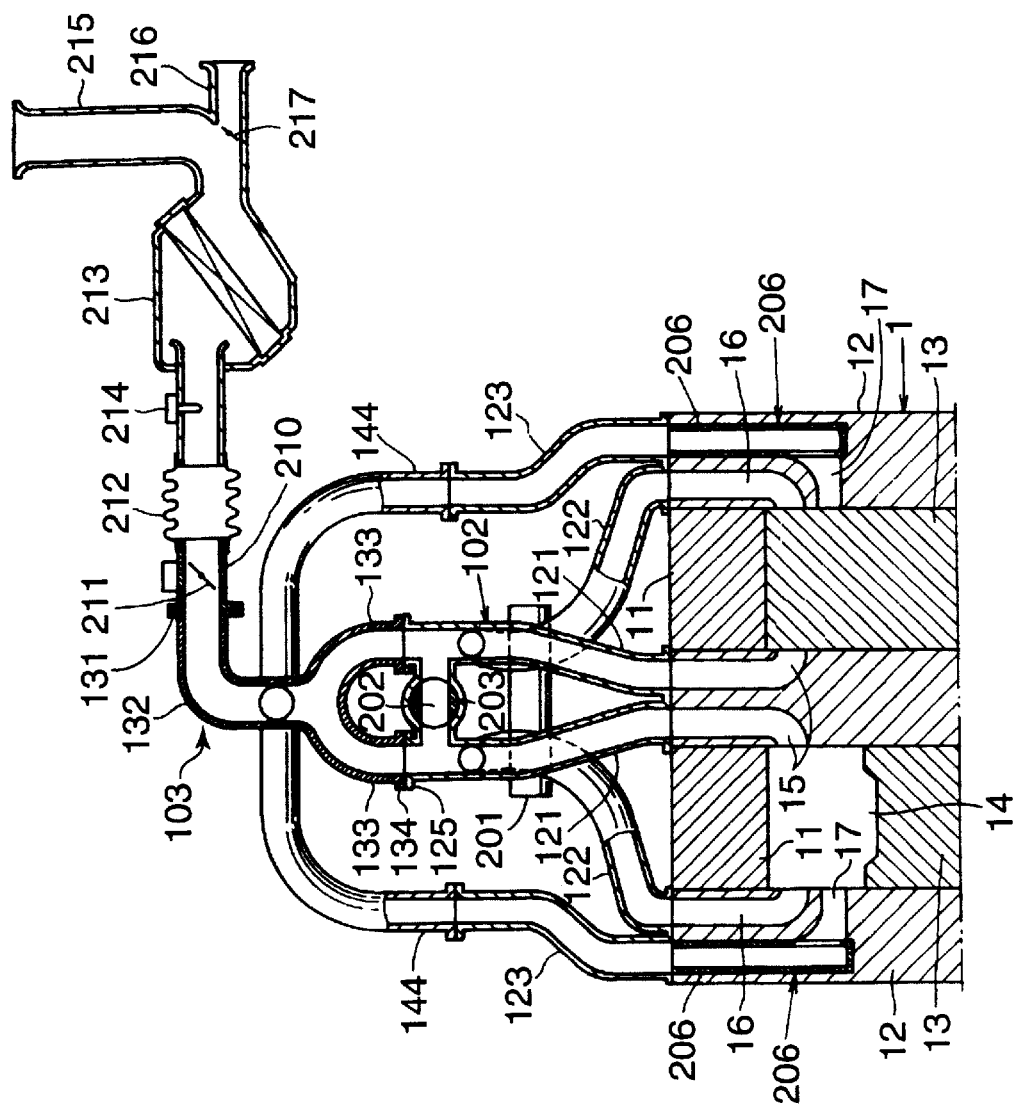
FIG. 9 is a diagram generally showing the structure of passages of the intake system of FIG. 7.
Figure 10:
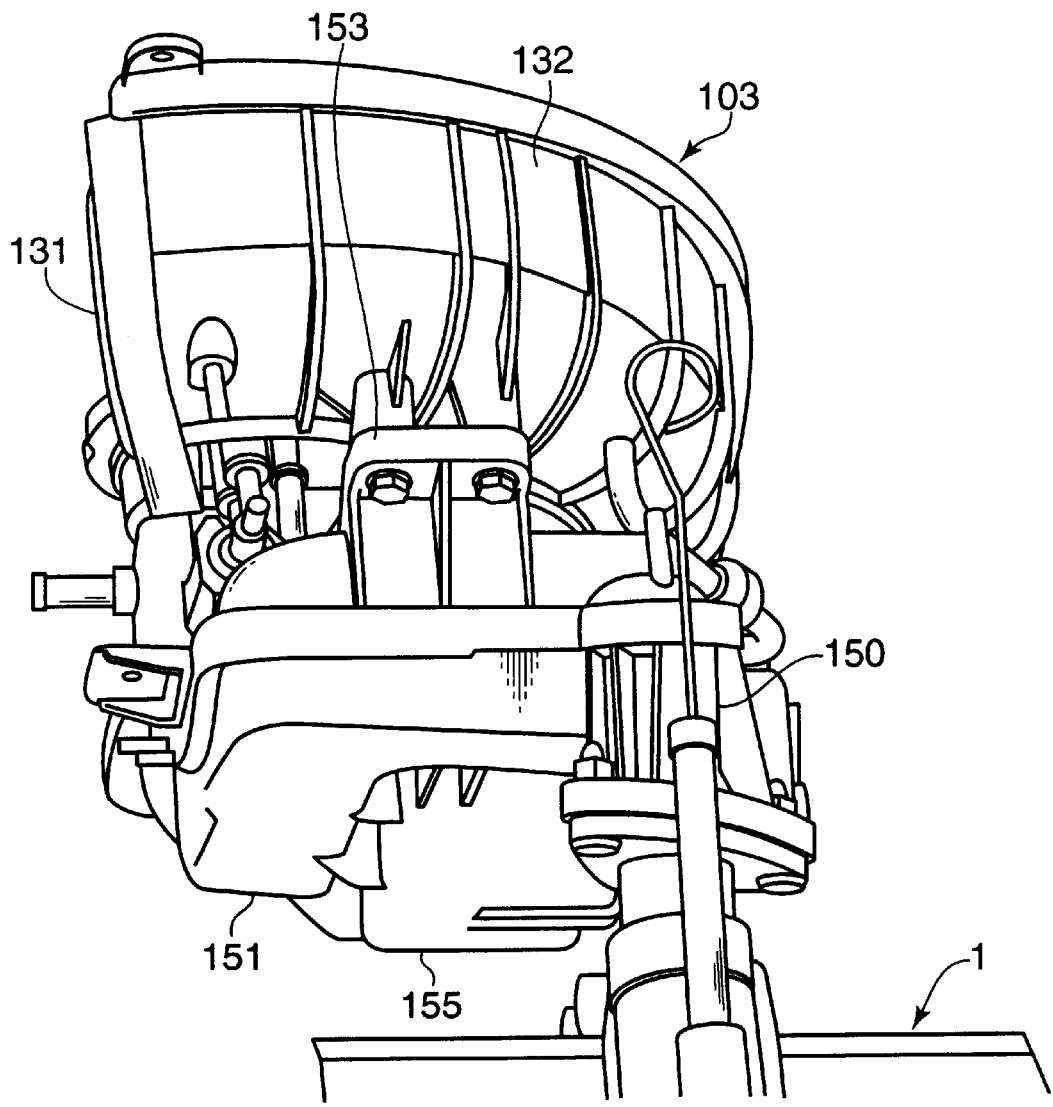
FIG. 10 is a perspective view of the intake system of FIG. 7 as it is viewed obliquely upward from the right side.
Figure 11:
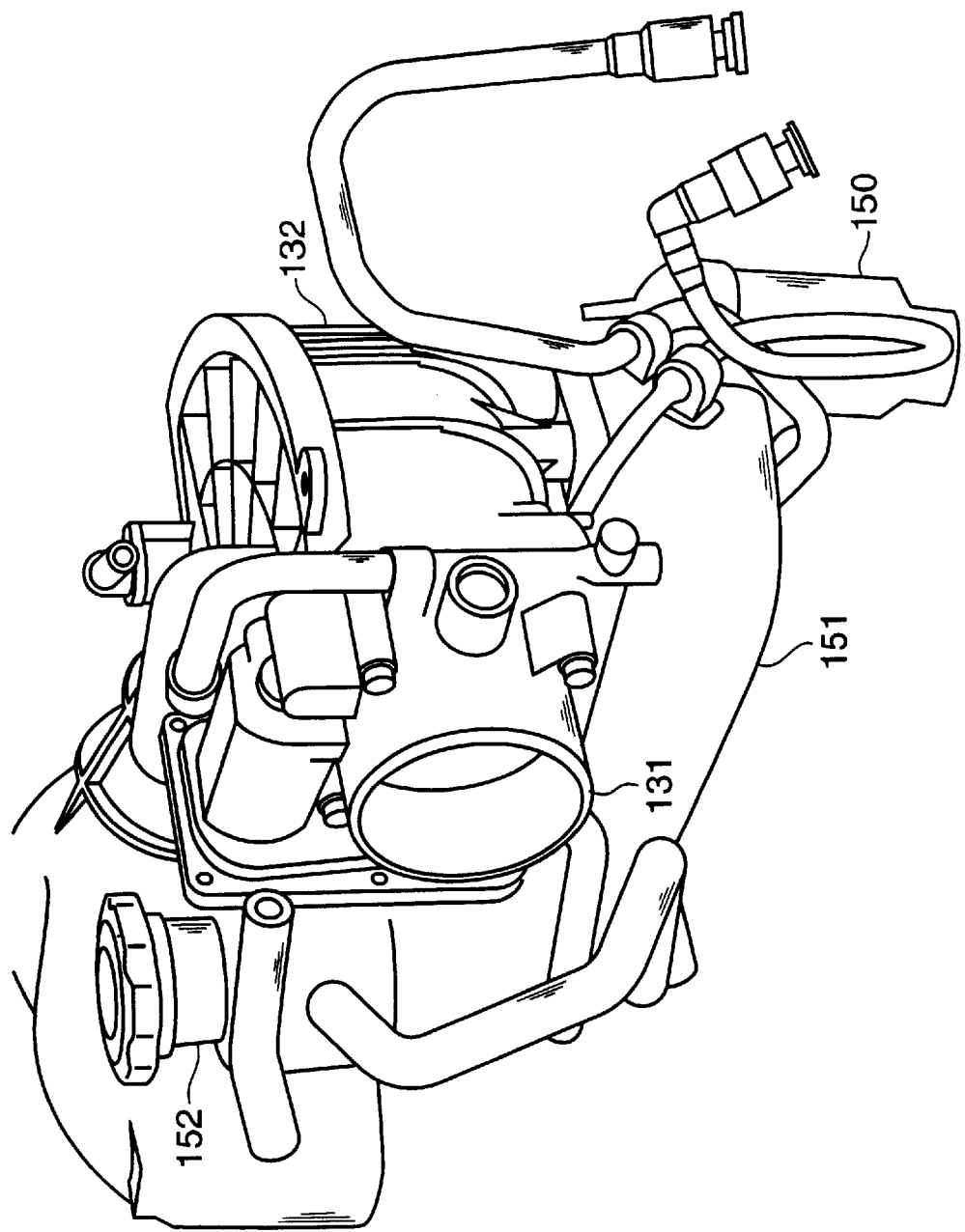
FIG. 11 is a perspective view of the intake system of FIG. 7 as it is viewed obliquely downward from the front side.
Figure 12:
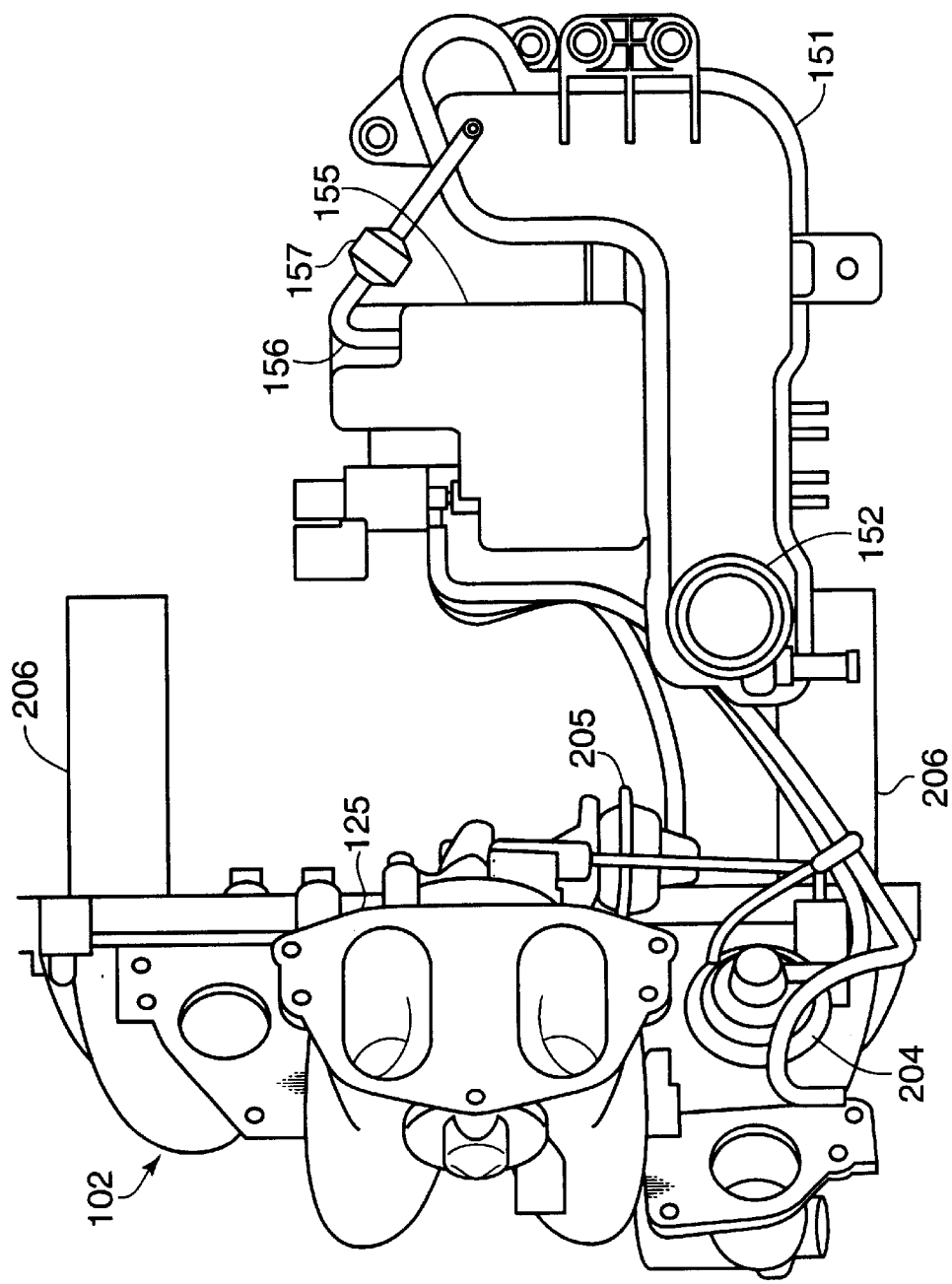
FIG. 12 is a plan view of part of the intake system of FIG. 7 with an intake module removed.
Figure 13:
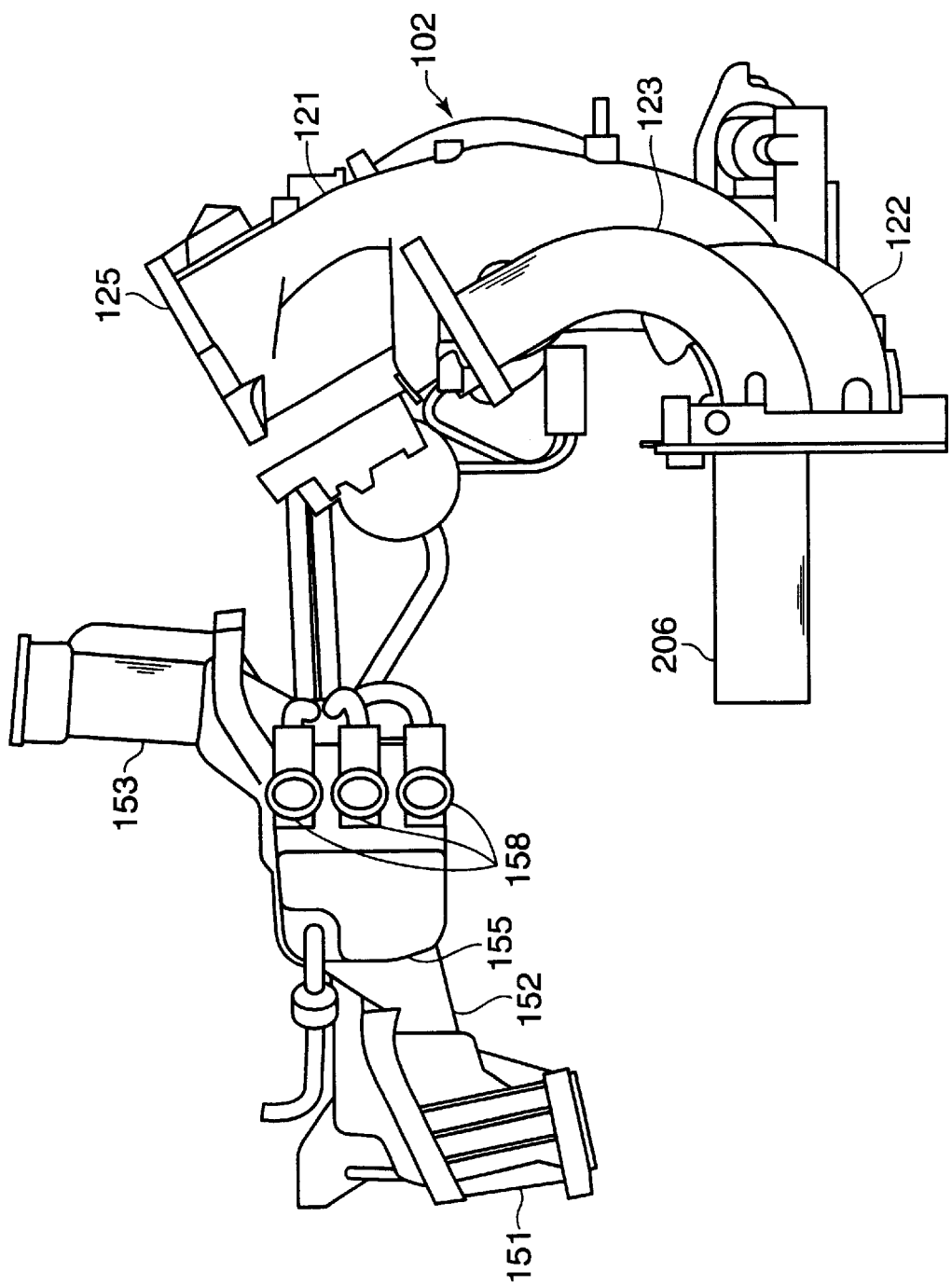
FIG. 13 is a side view of the part of the intake system shown in FIG. 12.
Figure 14:
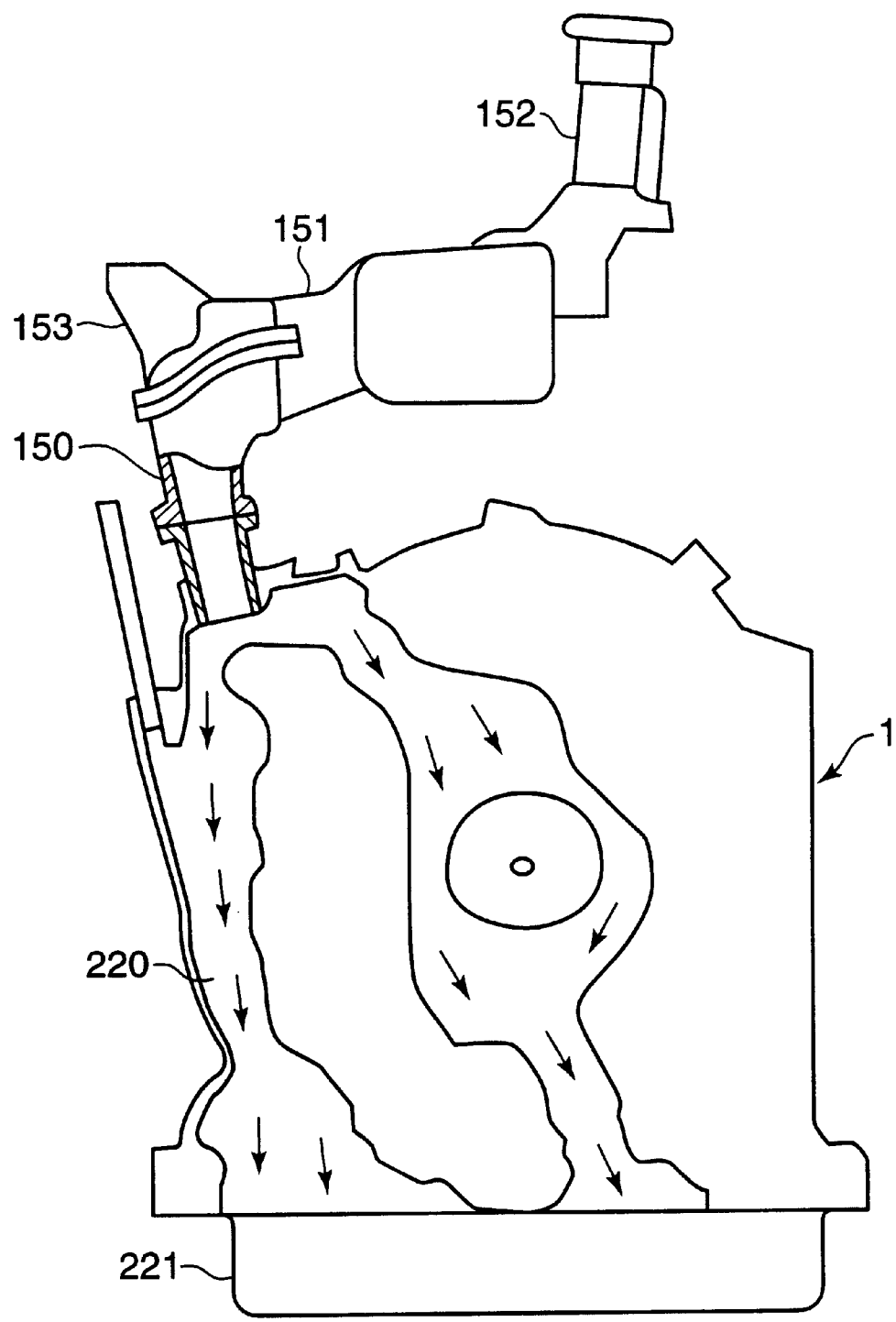
FIG. 14 is a side view generally showing an oil flow path running from an oil filler pipe to an oil pan.

In the downstream portion 102 of the intake manifold, the downstream side secondary intake passages 122 join to the respective downstream side primary intake passages 121, and downstream of their joining parts, a shutter valve 201 for simultaneously opening and closing the two downstream side secondary intake passages 122 according to engine operating conditions is provided at a point where the two downstream side secondary intake passages 122 come close to each other as shown in detail in FIG. 9. The interconnect passage 202 interconnects the two downstream side primary intake passages 121 upstream of the aforementioned joining parts of the downstream side primary intake passages 121 and the downstream side secondary intake passages 122, and a Verein Deutsher Ingenieure (VDI) valve 203 which opens and closes the interconnect passage 202 according to the engine operating conditions is provided in the interconnect passage 202. The aforementioned shutter valve 201 and the VDI valve 203 are operated by negative-pressure-responding actuators 204, 205 (see FIG. 7).

Also assembled in the downstream portion 102 of the intake manifold are two rotary valves 206 which penetrate into auxiliary intake ports from downstream end portions of the individual downstream side auxiliary secondary intake passages 123 to open and close the auxiliary intake ports and a motor 207 (FIG. 7) for driving the rotary valves 206 through transmission means.

Negative pressure is supplied to the actuators 204, 205 and the motor 207 is driven under the control of an unillustrated control unit according to the engine operating conditions. In a low-speed range of the engine, the shutter valve 201, the VDI valve 203 and the rotary valves 206 are all closed. The shutter valve 201 is opened when the engine speed exceeds a first set speed, the rotary valves 206 are opened when the engine speed exceeds a second set speed which is higher than the first set speed, and the VDI valve 203 is opened when the engine speed exceeds a third set speed which is higher than the second set speed.

The intake module 103 includes in a single structure a collecting passage portion 132 having as its integral part a throttle body joint portion 131 formed at an extreme upstream end of the collecting passage portion 132 and the aforementioned two intake air passages 133 connecting to the collecting passage portion 132. As stated above, the primary intake air passage 33 and the secondary intake air passage 43 of the first embodiment are combined into each intake air passage 133. As a consequence, the primary side throttle body joint portion 31 and the secondary side throttle body joint portion 41 of the first embodiment are combined into the single throttle body joint portion 131 and the primary side collecting passage portion 32 and the secondary side collecting passage portion 42 of the first embodiment are combined into the single collecting passage portion 132 in this second embodiment.

A flange 134 provided at a downstream end of the intake module 103 is bolted to a flange 125 provided at an upstream end of the downstream portion 102 of the intake manifold, whereby the intake module 103 is joined to the downstream portion 102 of the intake manifold with the intake air passages 133 connected to the respective downstream side primary intake passages 121 and downstream side secondary intake passages 122 which are joined to the downstream side primary intake passages 121.

The auxiliary secondary intake passages 144 are formed separately from the intake module 103. Downstream ends of the auxiliary secondary intake passages 144 are connected to the respective downstream side auxiliary secondary intake passages 123 while upstream ends of the auxiliary secondary intake passages 144 are connected to the intake module 103 close to a joining part of the two intake air passages 133.

A throttle body 210 incorporating a throttle valve 211 is connected to the throttle body joint portion 131 provided at an upstream end of the intake module 103. A clean air outlet of an air cleaner 213 is connected to the throttle body 210 through an air intake hose 212 and an airflow sensor 214 is fitted at the clean air outlet. A longer first fresh air duct 215 having a bent shape and a shorter second fresh air duct 216 having a straight shape are connected to a fresh air inlet of the air cleaner 213. As depicted in FIG. 9, a fresh air valve 217 is provided in the second fresh air duct 216. This fresh air valve 217 is opened and closed by a negative-pressure-responding actuator (not shown) which opens the fresh air valve 217 in a specific high-speed range of the engine.

The aforementioned downstream portion 102 of the intake manifold and the intake module 103 are structured such that, when they are joined together, an upstream portion of the intake module 103 is located above the engine body 1 and extends generally in a horizontal direction. An end portion of the intake module 103 opposite to its portion joined to the downstream portion 102 of the intake manifold is connected to a member of an oil filler pipe 150 which is constructed as shown in FIGS. 7, 10–14.

In this embodiment, the aforementioned member of the oil filler pipe 150 is made of synthetic resin material, integrally forming an oil catch chamber 151 located halfway in the oil filler pipe 150 as well as a negative pressure reservoir 155.

A lower end of the oil filler pipe 150 is fixed to an end portion of the engine body 1 opposite to its intake port side. The oil filler pipe 150 extends upward from the engine body 1 up to a position close to a bottom surface of an upstream portion of the collecting passage portion 132 of the intake module 103. The oil catch chamber 151 having a relatively large capacity is formed, extending sideways from this position of the oil filler pipe 150. An upper portion of the oil filler pipe 150 extending upward from a lateral end of the oil catch chamber 151 runs further upward along the side of the collecting passage portion 132 of the intake module 103. Oil supplied into the oil filler pipe 150 flows down into an oil pan 221 through a path 220 formed in the engine body 1 (see FIG. 14).

An extended portion 153 extending upward from an upper part of the oil catch chamber 151 is formed on the oil filler pipe 150 beneath the collecting passage portion 132 of the intake module 103. This extended portion 153 is fixed to the bottom of the collecting passage portion 132 by bolt joint, for instance.

The oil catch chamber 151 and the negative pressure reservoir 155 located next to each other are integrally formed and separated by a partition. Connected to the downstream side auxiliary secondary intake passage 123 through a pipe 156, a check valve 157, etc., the negative pressure reservoir 155 introduces and stores negative intake air pressure and supplies this negative pressure to a negative-pressure-responding actuators for actuating the on-off valves provided in the intake air passages. More specifically, the negative pressure reservoir 155 supplies the negative pressure to the actuator 204 of the shutter valve 201, the actuator 205 of the VDI valve 203 and the actuator of the fresh air valve 217 through solenoid valves 158. The oil catch chamber 151 and the negative pressure reservoir 155 are situated in a space between the intake module 103 and the engine body 1.

An evaporated fuel reservoir 160 is integrally formed in an outer wall of the collecting passage portion 132 of the intake module 103 above the oil catch chamber 151 and the negative pressure reservoir 155. The evaporated fuel reservoir 160 and the collecting passage portion 132 are interconnected by a purge path 161, and an evaporated fuel intake passage 162 (FIG. 15) and a purge valve 163 (FIG. 15) are connected to the evaporated fuel reservoir 160.

According to the above-described intake system of the second embodiment, the intake module 103 is formed of synthetic resin material to achieve a reduction in manufacturing cost as in the first embodiment. Particularly because the collecting passage portion 132 having the throttle body joint portion 131 and the intake air passages 133 for the individual cylinders connected to the collecting passage portion 132 provided in the intake module 103 of this second embodiment substitute for the primary and secondary side collecting passage portions 32, 42 having the primary and secondary side throttle body joint portions 31, 41 and the primary and secondary intake air passages 33, 43 of the first embodiment, the structure of the second embodiment is much simpler than that of the first embodiment and this is advantageous in further reducing the manufacturing cost.

Furthermore, as one end portion of the intake module 103 is joined to the downstream portion 102 of the intake manifold while the other end portion of the intake module 103 is supported by the engine body 1 via the oil filler pipe 150, sufficient mechanical stiffness to support the intake module 103 is obtained.

Furthermore, because the oil filler pipe 150 is also formed of synthetic resin in this embodiment and the oil catch chamber 151 for preventing overflow of oil and consequent oil leakage to the exterior during a turn of the vehicle, for example, is integrally formed with the oil filler pipe 150, the number of components is reduced compared to the conventional structures in which the oil catch chamber is formed separately from the intake module, enabling a reduction in the cost of the oil filler pipe 150 including the oil catch chamber 151.

Furthermore, since the extended portion 153 provided at the upper part of the oil catch chamber 151 which is located halfway in the oil filler pipe 150 is joined to the intake module 103, the oil filler pipe 150 and the intake module 103 effectively support and reinforce each other. This structure serves to provide increased mechanical stiffness for supporting the intake module 103 as well as sufficient stiffness of the oil filler pipe 150 itself which carries the weight of the relatively large oil catch chamber 151.

Moreover, the negative pressure reservoir 155 for storing the negative pressure to be supplied to the negative-pressure-responding actuators 204, 205, etc. is integrally formed with the oil filler pipe 150. This structure serves to further reduce the number of components and the manufacturing cost.

As already described, the oil catch chamber 151 and the negative pressure reservoir 155 are situated between the intake module 103 and the engine body 1. Thus, the oil catch chamber 151 and the negative pressure reservoir 155 are arranged effectively using a dead space, without taking up an extra space on the exterior of the intake system. This construction makes it possible to make the overall size of the engine compact.

While the invention is applied to the intake system of the engine body 1 provided with the primary intake ports 15, the secondary intake ports 16 and the auxiliary secondary intake ports 17 in the aforementioned first and second embodiments, it may be applied to an intake system of an engine body 1 unprovided with the secondary intake ports 16. This kind of intake system according to a third embodiment can be constructed by omitting the passages corresponding to the auxiliary secondary intake ports 17 of the first and second embodiments as shown in FIG. 15.

Figure 15:
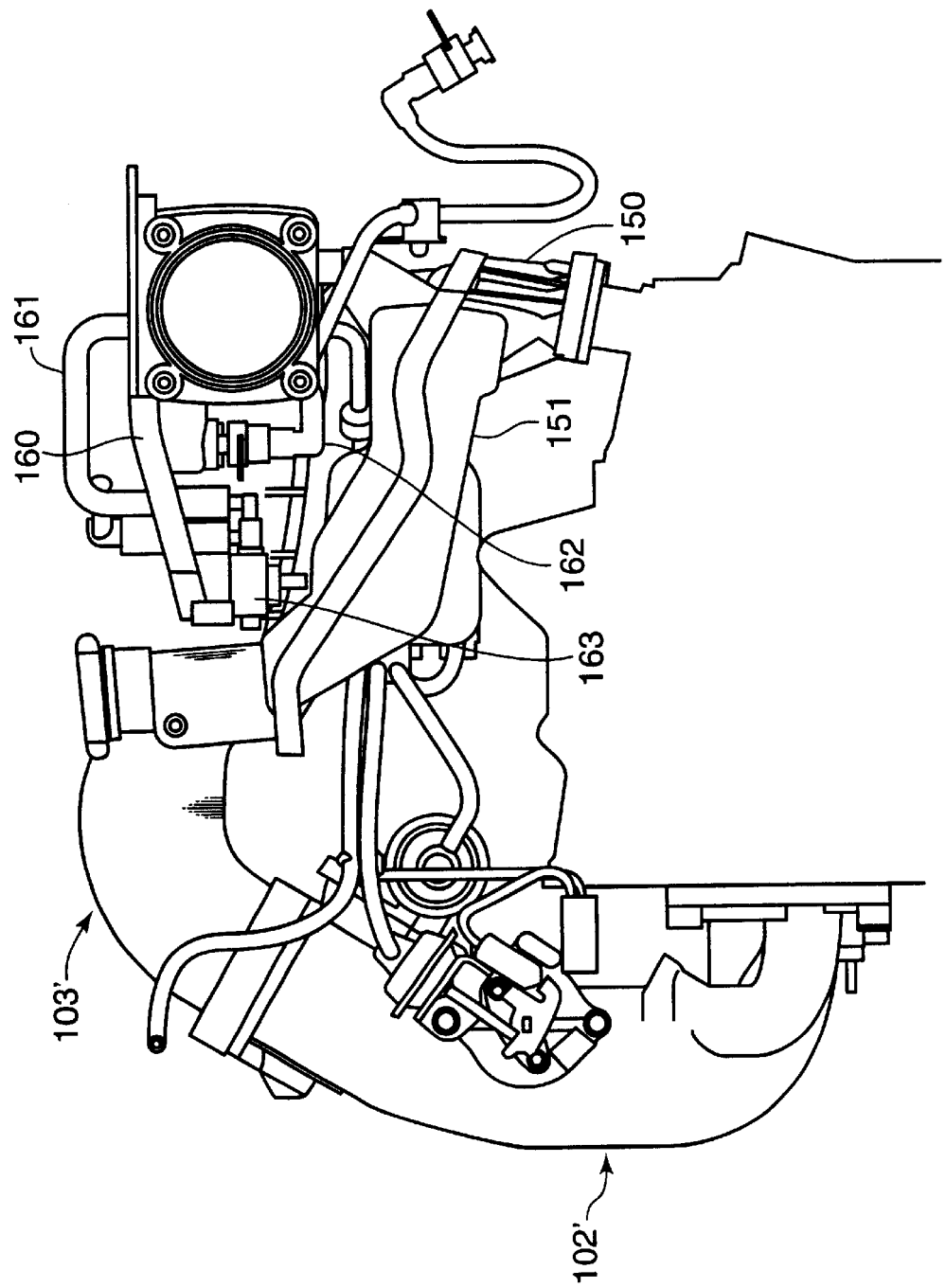
FIG. 15 is a fragmentary front view of a two-cylinder rotary engine incorporating an intake system according to a third embodiment of the invention.

The intake system of the third embodiment shown in FIG. 15 also has an intake module 103' made of synthetic resin material including a throttle body joint portion and an upstream portion of an intake manifold, as well as a downstream portion 102' of the intake manifold which is fixed to the engine body 1 and joined to a downstream end of the intake module 103'. While the intake module 103' and the downstream portion 102' of this intake manifold have generally the same construction as the intake module 103 and the downstream portion 102 of the intake manifold of the intake system according to the second embodiment, the auxiliary secondary intake ports 17 and the downstream side auxiliary secondary intake passages 23 are eliminated and the intake system is slightly redesigned accordingly. The oil filler pipe 150 of this third embodiment has the same structure as the second embodiment.

In summary, according to the invention, an intake system of an engine comprises an intake module in which a throttle body joint portion and an upstream portion of an intake manifold are formed in a single structure and a downstream portion of the intake manifold, the downstream portion extending from an engine body and being connected to a downstream end of the intake module, the engine including an oil filler pipe of which lower end is connected to the engine body and upper end is connected to the intake module such that the intake module is supported by the engine body via the oil filler pipe.

In this construction, the intake module is connected to the intake manifold and is supported by the engine body via the oil filler pipe, so that sufficient mechanical stiffness for supporting the intake module is obtained. In particular, because the intake module is supported by using the oil filler pipe, mechanism for supporting the intake module is simplified.

In the intake system thus constructed, it is preferable that the lower end of the oil filler pipe be connected to an oil pan provided in the engine body and an oil catch chamber connected to the upper end of the oil filler pipe be integrally formed in the intake module.

This construction is advantageous in that the number of components is reduced resulting in a cost reduction compared to conventional structures in which an oil catch chamber is formed separately from an intake module.

Preferably, the construction of the intake system is such that the engine body has two cylinders, three each intake ports opening into combustion chambers formed in the two cylinders, and the intake module includes a first constituent section having two intake passages for supplying intake air to one each intake port opening into the cylinders and a second constituent section having four intake passages for supplying intake air to two each intake ports opening into the cylinders, the first constituent section being disposed above the second constituent section.

This structure makes it possible to make the intake system compact in relation to the engine body provided with three each intake ports opening into the two cylinders and achieve increased stability.

In this structure, the intake system should preferably be constructed such that a joint surface of a first flange joint connecting the first constituent section to the downstream portion of the intake manifold lies generally in a horizontal plane whereas a second flange joint connecting the second constituent section to the downstream portion of the intake manifold is located closer to the engine body than the first flange joint and a joint surface of the second flange joint slopes down inward toward the engine body.

This construction makes it possible to prevent interference between the first flange joint and the second flange joint and increase flexibility in layout of the intake system.

In the intake system of the invention, the oil filler pipe may be formed of synthetic resin material. In this case, if an oil catch chamber is integrally formed with the oil filler pipe, the number of components can be reduced, resulting in a reduction in manufacturing cost.

In this construction, if an extended portion extending upward from an upper part of the oil catch chamber is formed on the oil filler pipe and this extended portion is connected to the intake module, the oil filler pipe carrying the weight of the relatively large oil catch chamber and components of the intake module effectively support each other, thereby enhancing the overall stiffness of the oil filler pipe.

The intake system of the invention may further comprise a negative-pressure-responding actuator for actuating an on-off valve provided in an intake passage, and a negative pressure reservoir for accumulating negative pressure to be supplied to the actuator. In this case, it is preferable that the negative pressure reservoir be also formed integrally with the oil filler pipe. This structure serves to further reduce the number of components and the manufacturing cost.

According to the invention, it is preferable that the oil catch chamber be provided in a space between the intake module and the engine body. It is also preferable that the negative pressure reservoir be provided in the space between the intake module and the engine body.

This construction makes it possible to effectively use the dead space left between the intake module and the engine body and to reduce the overall size of the engine.

As explained above, the intake system of the invention is constructed such that the intake module in which the throttle body joint portion and the upstream portion of the intake manifold are formed in a single structure is connected to the downstream portion of the intake manifold extending from the engine body, and the lower end of the oil filler pipe is connected to the engine body while the upper end of the oil filler pipe is connected to the intake module. According to the invention, the oil filler pipe is used as means for supporting the intake module which is also supported by the downstream portion of the intake manifold. Since the intake module is supported at two points in this construction, it is possible to simplify mechanism for supporting the intake module while obtaining increased mechanical stiffness for supporting it.

This application is based on two Japanese Patent Applications; one with Serial No. 2001-319807, filed in Japan Patent Office on Oct. 17, 2001 and the other with Serial No. 2002-264013 filed in Japan Patent Office on Sep. 10, 2002 domestically claiming a priority from JP 2001-319807, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An intake system of an engine comprising:
   an intake module in which a throttle body joint portion and an upstream portion of an intake manifold are formed in a single structure; and
   a downstream portion of the intake manifold, said downstream portion extending from one side surface of an engine body and being connected to a downstream end of the intake module;
   said engine including an oil filler pipe of which one end is connected to the other side surface of the engine body and the opposite end thereof is connected to the upstream end of the intake module such that the intake module is supported by the engine body via the oil filler pipe so that the intake module extends from the one side surface of the engine body towards the other side surface of the engine body and the substantial portion of the intake module is placed over the top surface of the engine body.

2. The intake system of the engine according to claim 1, wherein the one end of the oil filler pipe is connected to an oil pan provided in the engine body and an oil catch chamber connected to the opposite end of the oil filler pipe is integrally formed in the intake module.

3. The intake system of the engine according to claim 1, wherein the engine body has two cylinders, three intake ports opening into combustion chambers formed in each of the two cylinders, and said intake module increases a first constituent section having two intake passages for supplying intake air to one each intake port opening into the cylinders and a second constituent section having four intake passages for supplying intake air to two each intake ports opening into the cylinders, said first constituent section being disposed above said second constituent section.

4. The intake system of the engine according to claim 3, wherein a joint surface of a first flange joint connecting said first constituent section to the downstream portion of the intake manifold lies generally in a horizontal plane whereas a second flange joint connecting said second constituent section to the downstream portion of the intake manifold is located closer to the engine body than the first flange joint and a joint surface of the second flange joint slopes down inward toward the engine body.

5. The intake system of the engine according to claim 1, wherein the oil filler pipe is formed of synthetic resin material and an oil catch chamber is integrally formed with the oil filler pipe.

6. The intake system of the engine according to claim 5, wherein an extended portion extending upward from an upper part of the oil catch chamber is formed on the oil filler pipe and this extended portion is connected to said intake module.

7. The intake system of the engine according to claim 5, further comprising:
   a negative-pressure-responding actuator for actuating an on-off valve provided in an intake passage; and
   a negative pressure reservoir for accumulating negative pressure to be supplied to the actuator;
   wherein the negative pressure reservoir is integrally formed with the oil filler pipe.

8. The intake system of the engine according to claim 5, wherein the oil catch chamber is provided in a space between said intake module and said engine body.

9. The intake system of the engine according to claim 7, wherein the negative pressure reservoir is provided in a space between said intake module and said engine body.

10. An intake system of an engine comprising:
   an intake module in which a throttle body joint portion and an upstream portion of an intake manifold are formed in a single structure; and
   a downstream portion of the intake manifold, said downstream portion extending from an engine body and being connected to a downstream end of the intake module;
   said engine including an oil filler pipe of which one end is connected to the engine body and the opposite end thereof is connected to the intake module such that the intake module is supported by the engine body via the oil filler pipe;
   wherein the one end of the oil filler pipe is connected to an oil pan provided in the engine body and an oil catch chamber connected to the opposite end of the oil filler pipe is integrally formed in the intake module.

11. The intake system of the engine according to claim 10, wherein the engine body has two cylinders, three intake ports opening into combustion chambers formed in each of the two cylinders, and said intake module increases a first constituent section having two intake passages for supplying intake air to one each intake port opening into the cylinders and a second constituent section having four intake passages for supplying intake air to two each intake ports opening into the cylinders, said first constituent section being disposed above said second constituent section.

12. The intake system of the engine according to claim 11, wherein a joint surface of a first flange joint connecting said first constituent section to the downstream portion of the intake manifold lies generally in a horizontal plane whereas a second flange joint connecting said second constituent section to the downstream portion of the intake manifold is located closer to the engine body than the first flange joint and a joint surface of the second flange joint slopes down inward toward the engine body.

13. The intake system of the engine according to claim 10, wherein the oil filler pipe is formed of synthetic resin material and an oil catch chamber is integrally formed with the oil filler pipe.

14. The intake system of the engine according to claim 13, wherein an extended portion extending upward from an upper part of the oil catch chamber is formed on the oil filler pipe and this extended portion is connected to said intake module.

15. The intake system of the engine according to claim 13, further comprising:
   a negative-pressure-responding actuator for actuating an on-off valve provided in an intake passage; and
   a negative pressure reservoir for accumulating negative pressure to be supplied to the actuator;
   wherein the negative pressure reservoir is integrally formed with the oil filler pipe.

16. The intake system of the engine according to claim 15, wherein the negative pressure reservoir is provided in a space between said intake module and said engine body.

17. The intake system of the engine according to claim 13, wherein the oil catch chamber is provided in a space between said intake module and said engine body.

18. An intake system of an engine comprising:
   an intake module in which a throttle body joint portion and an upstream portion of an intake manifold are formed in a single structure; and
   a downstream portion of the intake manifold, said downstream portion extending from an engine body and being connected to a downstream end of the intake module;
   said engine including an oil filler pipe of which one end is connected to the engine body and the opposite end thereof is connected to the intake module such that the intake module is supported by the engine body via the oil filler pipe;
   wherein the engine body has two cylinders, three intake ports opening into combustion chambers formed in each of the two cylinders, and said intake module increases a first constituent section having two intake passages for supplying intake air to one each intake port opening into the cylinders and a second constituent section having four intake passages for supplying intake air to two each intake ports opening into the cylinders, said first constituent section being disposed above said second constituent section.

19. The intake system of the engine according to claim 18, wherein a joint surface of a first flange joint connecting said first constituent section to the downstream portion of the intake manifold lies generally in a horizontal plane whereas a second flange joint connecting said second constituent section to the downstream portion of the intake manifold is located closer to the engine body than the first flange joint and a joint surface of the second flange joint slopes down inward toward the engine body.

20. An intake system of an engine comprising:
   an intake module in which a throttle body joint portion and an upstream portion of an intake manifold are formed in a single structure; and
   a downstream portion of the intake manifold, said downstream portion extending from an engine body and being connected to a downstream end of the intake module;
   said engine including an oil filler pipe of which one end is connected to the engine body and the opposite end thereof is connected to the intake module such that the intake module is supported by the engine body via the oil filler pipe;
   wherein the oil filler pipe is formed of synthetic resin material and an oil catch chamber is integrally formed with the oil filler pipe.

21. The intake system of the engine according to claim 20, wherein an extended portion extending upward from an upper part of the oil catch chamber is formed on the oil filler pipe and this extended portion is connected to said intake module.

22. The intake system of the engine according to claim 20, further comprising:
   a negative-pressure-responding actuator for actuating an on-off valve provided in an intake passage; and
   a negative pressure reservoir for accumulating negative pressure to be supplied to the actuator;
   wherein the negative pressure reservoir is integrally formed with the oil filler pipe.

23. The intake system of the engine according to claim 20, wherein the oil catch chamber is provided in a space between said intake module and said engine body.

24. The intake system of the engine according to claim 22, wherein the negative pressure reservoir is provided in a space between said intake module and said engine body.

* * * * *

UNITED STATES PATENT AND TRADEMARK OFFICE
CERTIFICATE OF CORRECTION

PATENT NO. : 6,745,739 B2
DATED : June 8, 2004
INVENTOR(S) : Shinji Fujihira et al.

It is certified that error appears in the above-identified patent and that said Letters Patent is hereby corrected as shown below:

Column 12,
Line 28, delete "increases" and insert therefor -- includes --.

Column 13,
Line 21, delete "increases" and insert therefor -- includes --.

Column 14,
Line 10, delete "increases" and insert therefor -- includes --.

Signed and Sealed this

Seventeenth Day of August, 2004

JON W. DUDAS
*Acting Director of the United States Patent and Trademark Office*